(12) United States Patent
Christ et al.

(10) Patent No.: US 9,250,110 B2
(45) Date of Patent: Feb. 2, 2016

(54) VOLUME MEASUREMENT OF A LIQUID, METHOD AND DEVICE

(71) Applicants: Bernhard Christ, Munich (DE); Richard Schloderer, Krailling (DE)

(72) Inventors: Bernhard Christ, Munich (DE); Richard Schloderer, Krailling (DE)

(73) Assignee: DIONEX SOFTRON GMBH, Germering (DE)

(*) Notice: Subject to any disclaimer, the term of this patent is extended or adjusted under 35 U.S.C. 154(b) by 344 days.

(21) Appl. No.: 13/869,167

(22) Filed: Apr. 24, 2013

(65) Prior Publication Data

US 2013/0276524 A1     Oct. 24, 2013

(30) Foreign Application Priority Data

Apr. 24, 2012 (DE) .......................... 10 2012 103 573

(51) Int. Cl.
  *G01F 17/00* (2006.01)
  *G01F 19/00* (2006.01)
  *G01F 23/18* (2006.01)

(52) U.S. Cl.
  CPC ................ *G01F 17/00* (2013.01); *G01F 23/18* (2013.01)

(58) Field of Classification Search
  None
  See application file for complete search history.

(56) References Cited

U.S. PATENT DOCUMENTS

| 4,872,489 | A | * | 10/1989 | Erhart | ................. | F16D 35/00 |
|---|---|---|---|---|---|---|
| | | | | | | 141/5 |
| 5,059,954 | A | * | 10/1991 | Beldham et al. | ............... | 340/614 |
| 5,146,783 | A | * | 9/1992 | Jansche et al. | .................. | 73/301 |
| 5,802,910 | A | * | 9/1998 | Krahn et al. | ..................... | 73/299 |
| 5,861,554 | A | * | 1/1999 | Dimmick, Sr. | .......... | G01F 17/00 |
| | | | | | | 73/149 |
| 5,880,356 | A | * | 3/1999 | Delepierre-Massue | . | G01F 23/14 |
| | | | | | | 244/172.2 |
| 6,038,919 | A | * | 3/2000 | Schmitt | ................... | G01F 17/00 |
| | | | | | | 73/149 |
| 6,931,925 | B2 | * | 8/2005 | Huemer et al. | ................. | 73/299 |
| 7,156,380 | B2 | * | 1/2007 | Soininen | .................... | 261/122.1 |
| 7,419,598 | B2 | | 9/2008 | Davison | | |
| 2008/0296207 | A1 | | 12/2008 | Davison | | |
| 2013/0110417 | A1 | * | 5/2013 | Balogh et al. | ................... | 702/47 |

FOREIGN PATENT DOCUMENTS

DE    19826487 A1    12/1999
JP    11014528 A    1/1999

* cited by examiner

*Primary Examiner* — Peter Macchiarolo
*Assistant Examiner* — Jermaine Jenkins
(74) *Attorney, Agent, or Firm* — Timothy J. Ohara

(57) ABSTRACT

Methods of volume measurement of a liquid are described. During extraction or feed of the liquid, at least two time points of the altered volume of the liquid is measured. Respective hydrostatic pressures are measured at these time points. The pressure difference is determined and the current volume of the liquid present in the container is determined.

8 Claims, 2 Drawing Sheets

VOLUME MEASUREMENT OF A LIQUID, METHOD AND DEVICE

FIELD OF THE INVENTION

The invention relates to a method of volume measurement of a liquid medium. Methods of this kind are used for example in high-performance liquid chromatography systems, for determining an available volume of a solvent.

BACKGROUND

High-performance liquid chromatography (HPLC) is a method of separating mixtures (analysis of a sample) by means of a separating column, optionally including a subsequent evaluation. Using an HPLC pump, a solvent flow is produced, which transports the sample, containing the mixture to be separated, through the separating column. Separation takes place owing to chemical interactions between the constituents of the sample and the stationary phase (packing) of the column.

Before investigating or analyzing several, for example ten samples (batch) or an individual sample, in HPLC it is desirable to know in advance whether the amount of solvent present is sufficient for the next sample, as otherwise it is necessary to stop in the middle of the analysis, and the analysis of the sample becomes invalid.

However, hydrostatic measurement of levels in containers, as proposed for example in DE 198 26 487 A 1, has some decisive disadvantages, especially for use in HPLC. For example, in HPLC the density of the solvent and the cross-sectional area of the bottles are not known by the HPLC system. These values would therefore have to be entered by the user before beginning a test or a sample analysis.

The problem to be solved by the invention is therefore to devise a method and a device for measuring a volume, which provide results reliably and accurately, and operate as conveniently as possible for a user.

SUMMARY

A method of a volume measurement of a liquid in a container is described. The liquid can be drawn from the container over a period of time. A volume change of the liquid can be measured in the container at two measuring points. Respective hydrostatic pressures can be detected before and after the volume change of the liquid in the container. A pressure difference can be determined based on the hydrostatic pressures before and after the volume change of the liquid in the container. A hydrostatic pressure can be measured at a current time. A current volume of the liquid present in the container can be calculated based on the volume change, the pressure difference, and the hydrostatic pressures at the current time.

In regards to the above method, it can further include dividing the volume change by the pressure difference to form a ratio. The ratio can be multiplied by the hydrostatic pressures at the current time to output the calculated current volume.

In regards to the above method, the current volume can be calculated using an equation. The equation is $V_R = P_R * \Delta V / \Delta P$, where $V_R$ is the current volume of the liquid remaining in the bottle, $P_R$ is the hydrostatic pressure at the current time, $\Delta V$ is the volume change, and $\Delta P$ is the pressure difference.

In regards to the above method, the container can have a change in a cross sectional area over a height of the container. The method can further include measuring a plurality of volume changes of the liquid in the container over a period of time. A plurality of hydrostatic pressures can be detected that correspond to before and after each of the volume changes of the liquid in the container. The current volume of the liquid present can be calculated in the container based on the hydrostatic pressures at the current time, the change in cross sectional area over the height of the container, the plurality of volume changes, and the plurality of hydrostatic pressures.

In regards to the above method, a cross sectional area over a height of the container can be essentially constant.

In regards to the above method, the volume change can be determined by a measurement of the volumetric flow rate or a piston displacement of a pump over a time interval of the two measuring points.

In regards to the above method, it can further include determining whether the current volume of the liquid in the container is sufficient for at least one further test of a sample. Where the current volume is not sufficient for the at least one further test of the sample, an acoustic or visual alarm can be issued, or an analysis of a sample can be terminated.

In regards to the above method, the hydrostatic pressure can be measured with a measurement hose that is connected to the container. The measurement hose can have a first cross sectional area, a second cross sectional area, and a transition where a cross sectional area of the measurement hose changes from the first cross sectional area to the second cross sectional area. The method can further include measuring a gradient change in pressure that occurs when a height of the liquid corresponds to the transition where the cross sectional area of the measurement hose changes from the first cross sectional area to the second cross sectional area.

A device configured to measure a volume of a liquid in a container is described. The device can include a pressure sensor, a measurement hose, a pump, and a control device. The pressure sensor is configured to measure a hydrostatic pressure in the container over a period of time. The measurement hose is connected to the pressure sensor. The measurement hose has an end region arranged in the container at a predefined height above a bottom of the container. The pump is configured to draw the liquid from the container over the period of time. The control device is configured to determine a current volume of the liquid in the container based on a change of a volume of the liquid and at least two measurements of the hydrostatic pressure. The measurement hose may be connected to the pressure sensor via a valve.

In regards to the above device, the measurement hose can have a first cross sectional area, a second cross sectional area, and a transition where a cross sectional area of the measurement hose changes from the first cross sectional area to the second cross sectional area, and the first and the second cross sectional areas are different.

In regards to the above device, it can further include a storage device configured to store a cross sectional area of the container, a volume of the container, and hydrostatic pressure values measured over the period of time.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

DETAILED DESCRIPTION OF EMBODIMENTS

Figure 1:
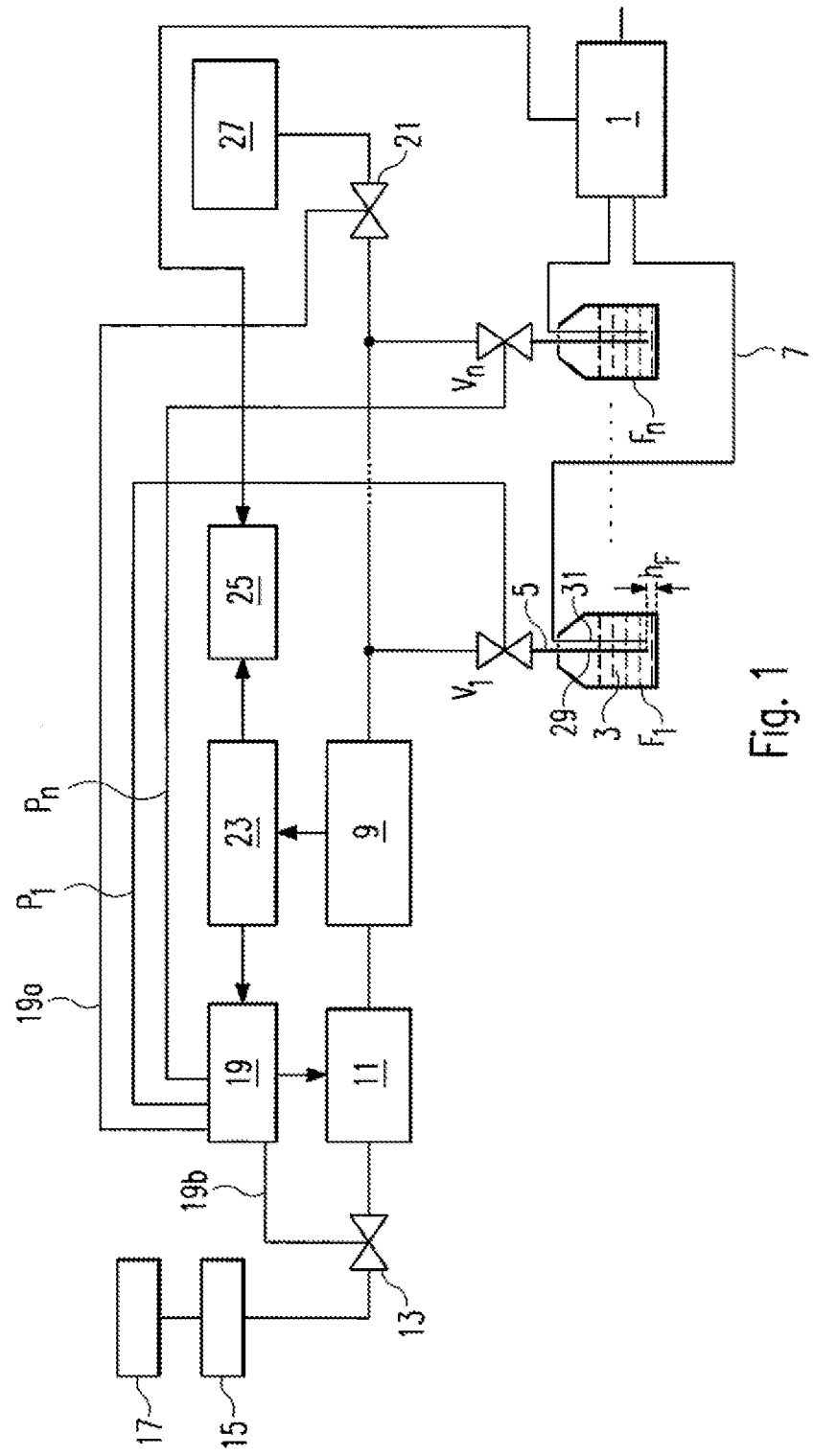
FIG. 1 is a schematic block diagram of a device according to the invention.

By using a hydrostatic measuring technique for determining the pressure change and by including an extracted volume, the result is independent of the density of the medium or of the cross section of the container and nevertheless provides the desired results accurately and reliably. With an essentially constant cross section, with just two measuring points (before and after removing a, preferably small, amount, i.e. in the single-digit percentage range, especially below 10 percent), the current volume of the medium in the container can be determined automatically, without the density or container cross section being known to the system or having to be entered in the system.

Then, based on a ratio of volume change to change of the hydrostatic pressure, determined for example once (at an earlier or later time point), the current volume of the medium can be determined at any time point, i.e. even if there is a subsequent or previous further change in volume. For this it is possible in particular to use a currently determined value of the hydrostatic pressure of the medium.

If the container cross section is not constant, with the method according to the invention, by means of a plurality of repetitions or multiple-point measurements over different time points and extracted volumes, the current volume of the medium in the container can be determined adequately (e.g. iteratively), without the (precise) container geometry or density of the medium having to be known beforehand or entered.

According to the invention, not only the level, but also the currently available volume of the medium in the container can be determined automatically without assistance from the user. Before the start of a test series (batch) or at least a next test (or analysis of a next sample), it can advantageously be ascertained whether the amount of solvent remaining in the container is sufficient for at least one further test or a definable number of further tests. If negative, a corresponding report (acoustic and/or visual alarm) is issued and/or the start of a test is prevented. The user of the system now has the opportunity to take appropriate action (adding solvent, changing the test or the test parameters, etc.), which make it possible to carry out at least one further test.

In an advantageous configuration of the invention, the method according to the invention and the device can be used for measuring current volumetric contents (of a particular liquid medium) of several containers. In this case it is conceivable, by multiplexing between several containers, to apply the method according to the invention quasi-simultaneously, using a hydrostatic measuring device and an evaluation and/or control device (successively) for several containers, wherein measured values obtained can also be stored temporarily for further processing. In this way it is advantageously possible to reduce the expenditure on devices and therefore the complexity of a complete system with several containers. As the essential elements for carrying out the method according to the invention (pump, evaluation and/or control device, etc.) can be used repeatedly, each further channel for volume measurement only means extra expenditure for an additional valve and an additional measurement hose.

Moreover, it is conceivable to save earlier measured values (pressure values, volume values, geometries determined, cross sections, densities, etc.) of earlier measurements in a memory or a storage device and make use of them for later measurements. In this way, any tolerances present can be compensated and results can be compared and verified (redundancy check, etc.).

If additional general information such as density of the medium within a particular range (although without exact, absolute value) and/or different types of bottles (though without stating the type currently used) is predefined, this information can moreover also be included in the evaluation, in order to detail or to verify the results or even to enable a statement to be made for the first time about a particular selection (density of the currently used medium and/or currently used type of bottle).

In a further configuration of the invention, the variation of the hydrostatic pressure and/or the change in volume over time are determined, so that a large number of measured values at any particular time points are available.

In a preferred configuration of the invention, the extracted volume is determined by measurement of the volumetric flow rate or evaluation of the piston displacement of a pump over the time interval during extraction. In this way, a pump available for the extraction or feed or its known pump parameters can advantageously be used for calculating the volume change.

In another configuration of the invention, the hydrostatic pressure is measured by means of a measurement hose, which has an altered cross section in the end region, wherein the change in cross section during the measurement is detected as a continuously undifferentiated point (with respect to the pressure) of the curve of "pressure versus time". In this way it is advantageously possible to determine the hydrostatic pressure on reaching the change in cross section of known level (relative to the total height of the medium above the bottom of the container or the bottom edge of the pump hose) (continuously undifferentiated point at constant pumping rate or simple change in slope at constant pumping rate), without the gas present in the measurement hose already escaping into the medium. In this way it is possible to avoid gassing of a liquid medium, in particular a solvent in HPLC previously degassed by the user.

Gassing of a solvent would be a particular disadvantage in HPLC, as this can cause a whole range of problems (for example as explained non-exhaustively below).

Thus, dissolved gases increase the UV absorption of the liquid. In the UV absorption detectors usually employed in HPLC systems, this becomes noticeable as increased noise. The formation of bubbles can impair pump function. At higher temperature, such as occurs as a rule e.g. in a chromatography column (through frictional heat and possibly external heating), even at normal ambient pressure, dissolved gas can become gaseous again and form bubbles. In practically all the usual detection techniques, this leads to disturbances, e.g. disturbing peaks in the optical detector or spray instabilities in the mass spectrometer.

According to the invention, the method according to the invention is carried out with a device, especially an HPLC system, wherein an end region of a measurement hose is arranged in the container at a predefined height above the bottom of the container and a liquid medium, preferably solvent, present in the container is extracted from (or is supplied to) the container by means of a pump, especially an HPLC pump. For this purpose, this device has an evaluation and/or control device, which can be configured or integrated in a PC or as several components.

According to the invention, advantageously the information on the stored volumes or current volumes is automatically available to any system, especially an HPLC system. In the case when a system, such as for example as a rule an HPLC system, knows the requirement for solvent before the start of the analysis, therefore for example running out of solvent can already be predicted before the analysis of an HPLC sample and the analysis can be terminated or not even started, or the user can be informed about the lack of solvent. The user does not have to provide the system with any information in the form of details about bottle size or density of the solvent.

The equipment depicted in FIG. 1 shows an HPLC system with an HPLC pump 1, without going into more detail regarding other elements of an HPLC system present on the output side, such as injector, separating column etc. On the input side, a hose 7 is connected to the pump 1, and the other end of the hose is introduced into a reservoir in the form of a bottle $F_1$, where it dips into a solvent 3. The end region 31 of the hose 7 is located in bottle $F_1$ at a small, relative to the height of the bottle, height $h_F$ above its bottom, so that a solvent 3 present in the bottle $F_1$ can be drawn via hose 7 by the pump 1 and the bottle $F_1$ can preferably be emptied as far as possible.

Furthermore, in the bottle $F_1$, preferably at the same height $h_F$ above its bottom, there is the end region 29 of a measurement hose 5, which is connected outside of the bottle via a valve $V_1$ to a pressure sensor 9. Moreover, this connection can communicate via a valve 21 with the surroundings (air and pressure). The measurement hose 5 preferably consists of HPLC-compatible inert plastics (for example PEEK, PTFE, ECTFE).

The above and the following details regarding the bottle $F_1$, the valve $V_1$, the hose 7 and therefore the connection to pressure sensor 9 and pump 1 stand for example for a large number of possible bottles $F_1$ to $F_n$, each of which has its own hose 7 to the pump 1 and its own measurement hose 5 via a respective valve $V_1$ to $V_n$ to the pressure sensor 9. So as to be able to measure several storage bottles $F_1$ to $F_n$ with one device, the pressure source, especially pump 11, is switched via valves $V_1$ to $V_n$ selectively to the individual bottles $F_1$ to $F_n$.

The measurement hose 5 is in addition connected to the pump 11, which is connected via a valve 13 and a filter 15 to a gas supply 17.

The valves 13, 21, $V_1$ to $V_n$, receive their control signals via control lines 19a, 19b and $P_1$ to $P_n$ from a control device 19, which additionally serves for controlling the pump 11.

For communicating corresponding control signals, the control device 19 is connected to an evaluator or is integrated in one, which receives signals of the pressure sensor 9. The evaluator 23 furthermore receives, directly or, as shown in FIG. 1, via an interposed arithmetic unit, especially a personal computer 25, signals of the HPLC pump 1 relating to its volume flow intake.

For measuring a current volume or residual volume present in the bottle $F_1$ to $F_n$, the pump 11, especially a membrane pump (controlled by the control device 19 or control electronics) takes in ambient air or gas 17 via filter 15. Filter 15 can in this case operate simultaneously as throttling element, to control the volumetric flow rate.

The compressed air or compressed gas is pumped via the previously opened valve $V_1$ (controlled by the control device 19) into the measurement hose 5. The pressure sensor 9, in particular a semiconductor sensor (with a measurement range absolute pressure 0-100 kPa) measures the pressure and sends this to evaluation electronics or evaluator 23.

The evaluator 23, which can of course also comprise the integrated control device 19 and further electronics in the form of a PC, detects an abrupt, continuously undifferentiated pressure change in the measurement hose 5, which occurs on outflow of the gas or air, and switches off pump 11.

As bubbles can emerge during this, the end region 29 of the measurement hose can advantageously have a change in cross section before the discharge end, which produces a detectable change in pressure gradient before bubbles escape into the solvent 3. With increased cross section, for example, the pressure rise decreases despite constant delivery of the pump 11.

Figure 2:
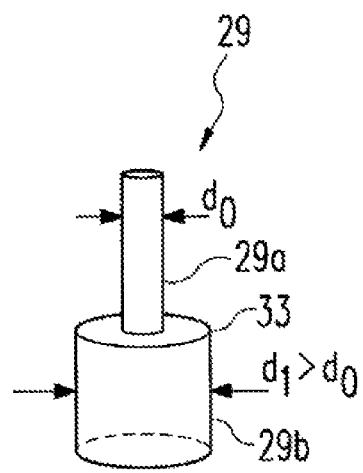
FIG. 2 is an enlarged view of an end region of a measurement hose from FIG. 1.

As shown in FIG. 2, for this purpose the end region 29 can have a transition, for example in the form of a straight or slanting shoulder 33, so that at this shoulder the inside diameter and therefore the internal cross section of the (preferably circular-cylindrical) hose 5 increases abruptly from $d_0$ to $d_1$.

Figure 3:
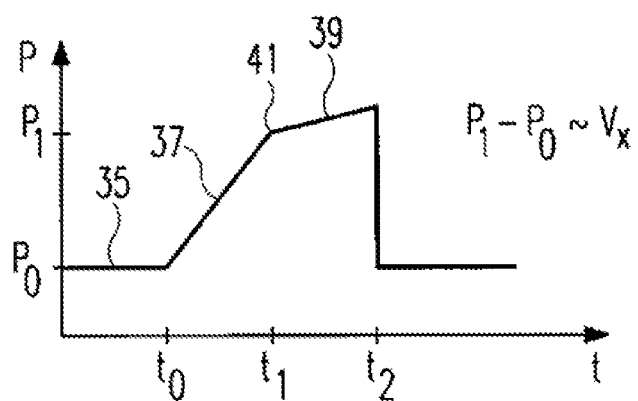
FIG. 3 is a pressure-time diagram of a hydrostatic measuring method carried out according to the invention with a measurement hose according to FIG. 2.

As shown in FIG. 3, the pressure increases from an initial pressure $P_0$ (for example ambient pressure or increased pressure of the test environment), shown in the diagram as horizontal region 35, from time point $t_0$, at which the pump 11 begins to compress the air or gas, continuously over a region 37 until a time point $t_1$, at which the gradient changes abruptly or has, in the pressure-time diagram, a continuously undifferentiated point or a continuously undifferentiated transition 41. Starting from this detectable point, the pressure increases more slowly again, owing to the increase in internal cross section at the shoulder 33. Correspondingly, the pressure $P_1$ is detected at time point $t_1$, so that a further pressure increase becomes unnecessary and supply of the gas can be stopped (pump 11 is switched off), before bubbles escape. The region 39 therefore only stands for example for a possible reaction time or time lag of the system, especially of pump 11, wherein this time lag is shown with exaggerated time in the diagram.

Then the system is vented via the further valve 21 (by opening thereof) or is connected to the surroundings 27, so that the pressure decreases again (drops to $P_0$). Then the measuring valve $V_1$ and the vent valve 21 are closed and the next bottle $F_2$ to $F_n$ is measured, wherein, instead of valve $V_1$ in the above explanations, the respective valve $V_2$ to $V_n$ is correspondingly opened and pump 11 is switched on again.

If a pump 11 is used, which in the "OFF" state allows air through from the inlet to the outlet, it may be advantageous to include another valve 13 before (or even after) the pump, to prevent the unintentional volume flow.

The pressure $P_0$ can be measured either before measurement, or after measurement of $P_1$. The pressure $P_1$ is either determined by evaluation in the arithmetic unit 25 (CPU) at the break 41 of the pressure-time curve, or is measured after the pump 11 has been switched off. The pressure difference $P_1-P_0$ therefore corresponds to the pressure of the liquid solvent 3 due to gravity.

The HPLC pump 1, which draws the solvent 3 from the bottles, sends the information about the volume flow it draws as a function of time and therefore the volume of solvent 3 extracted in a time interval, to the arithmetic unit 25. The latter also receives the data of the evaluator 23 and calculates, from the pressure $P_1$ after extraction and pressure $P_1$ before extraction of any, preferably small amount of solvent, the amount of solvent 3 still available in the bottle $F_1$ to $F_n$. Assuming an essentially constant cross section over the height of the bottle, the pressure of the solvent 3 due to gravity is not only proportional to the level, but also proportional to the current volume of solvent 3 in the bottle $F_1$ to $F_n$. In the calculation, the ratio of bottle internal cross section and density (volume~cross section*pressure difference/density) is present in both equations, so that the remaining volume can be determined without knowing the cross section of the bottle $F_1$ to $F_n$ and without knowing the density of the solvent. If we wish to determine the remaining volume of the solvent 3 at a specified (later) time point, it is also possible to use an earlier calculation of the ratio $\Delta V/\Delta P$ (for a particular solvent in a particular container). The remaining volume $V_R$ can then be determined from a current measurement of the hydrostatic pressure $P_R$ of the solvent 3 using the previously determined ratio $\Delta V/\Delta P$.

$\Delta V$=extracted volume
$\rho$=density of the medium, especially of the solvent
A=cross section of the container, especially of the bottle
g=acceleration due to gravity
h=height of the column of liquid (level)
$\Delta h$=height difference between state before and after extraction $\Delta V$
$P_0$=initial pressure
$\Delta P$=pressure difference between state before and after extraction $\Delta V$ Extraction $\Delta V$:

$$\Delta V = A * \Delta h$$

$$\Delta P = \rho * g * \Delta h$$

$$\Delta V/\Delta P = A/(\rho * g)$$

$V_R$=remaining volume of solvent in the bottle after extraction $\Delta V$
$h_R$=level of the remaining volume $V_R$
$P_R$=hydrostatic pressure after extraction $\Delta V$ (without $P_0$)

$$P_R = \rho * g * h_R$$

$$V_R = A * h_R = P_R * A / (\rho * g) = P_R * \Delta V/\Delta P$$

As the extracted volume $\Delta V$, the pressure difference $\Delta P$ between state before and after extraction $\Delta V$ and the hydrostatic pressure $P_R$ after extraction $\Delta V$ are measured, it is therefore possible to determine the remaining volume $V_R$ of solvent in the bottle (after extraction $\Delta V$).

At constant cross section A, in addition, if the density $\rho$ of liquid solvents 3 only varies within a known range, for example between approx. 0.8 g/cm³ and 1.1 g/cm³, even the density $\rho$ of the solvent 3 can be determined automatically, based on a stored set of usual cross-sectional areas A.

If the bottles $F_1$ to $F_n$ do not have a constant cross section A, a prediction of the remaining volume $V_R$ can nevertheless be made with high probability, if basic information is known about the bottle geometry with respect to the change in cross section over the height, without absolute values being required.

In this case too, the remaining volume $V_R$ can be determined automatically with a two-point measurement of the hydrostatic pressure at different time points and a corresponding intermediate extraction $\Delta V$ of solvent 3.

Even if there is no information about the bottle geometry, it is conceivable to determine the relevant data from a large number of (at least temporarily stored) measurements iteratively with respect to a large number of partial amounts extracted and the associated pressure changes detected.

Provided at least bottle sizes, for example 1 liter, 2 liters, 3 liters etc. are known and/or bottle heights of different bottles that can be used are known, this information can be incorporated in the aforementioned calculations, in order to simplify and speed up the determination of results and increase the accuracy.

As the method explained above is based on a volume change (decrease or increase), it is also conceivable to apply the method according to the invention during filling (and thus feed instead of extraction $\Delta V$) of a container with a liquid medium.

What is claimed is:

1. A method of a volume measurement of a liquid in a container, the method comprising:
   drawing the liquid from the container over a period of time;
   measuring a volume change of the liquid in the container at two measuring points;
   detecting respective hydrostatic pressures before and after the volume change of the liquid in the container;
   determining a pressure difference based on the hydrostatic pressures before and after the volume change of the liquid in the container;
   measuring a hydrostatic pressure at a current time; and
   calculating a current volume of the liquid present in the container based on the volume change, the pressure difference, and the hydrostatic pressures at the current time.

2. The method of claim 1 further comprises:
   dividing the volume change by the pressure difference to form a ratio; and
   multiplying the ratio by the hydrostatic pressures at the current time to output the calculated current volume.

3. The method of claim 2, in which the current volume is calculated using an equation, the equation comprising:

$$V_R = P_R * \Delta V/\Delta P,$$

where $V_R$ is the current volume of the liquid remaining in the bottle, $P_R$ is the hydrostatic pressure at the current time, $\Delta V$ is the volume change, and $\Delta P$ is the pressure difference.

4. The method of claim 2, in which the container has a change in a cross sectional area over a height of the container, the method further comprising:
   measuring a plurality of volume changes of the liquid in the container over a period of time;
   detecting a plurality of hydrostatic pressures that correspond to before and after each of the volume changes of the liquid in the container;
   calculating the current volume of the liquid present in the container based on the hydrostatic pressures at the current time, the change in cross sectional area over the height of the container, the plurality of volume changes, and the plurality of hydrostatic pressures.

5. The method of claim 1, in which a cross sectional area over a height of the container is essentially constant.

6. The method of claim 1, in which the volume change is determined by a measurement of a volumetric flow rate or a piston displacement of a pump over a time interval of the two measuring points.

7. The method of claim 1 further comprising:
   determining whether the current volume of the liquid in the container is sufficient for at least one further test of a sample;
   where the current volume is not sufficient for the at least one further test of the sample, issuing an acoustic or visual alarm, or terminating an analysis of a sample.

8. The method of claim 1, in which the hydrostatic pressure is measured with a measurement hose that is connected to the container; the measurement hose having a first cross sectional area, a second cross sectional area, and a transition where a cross sectional area of the measurement hose changes from the first cross sectional area to the second cross sectional area, the method further comprising:
   measuring a gradient change in pressure that occurs when a height of the liquid corresponds to the transition where the cross sectional area of the measurement hose changes from the first cross sectional area to the second cross sectional area.

* * * * *